June 23, 1959   C. R. SUMMERS, JR   2,892,002
POLYMERIZATION OF OLEFINS AND REACTOR THEREFOR
Filed Feb. 28, 1955
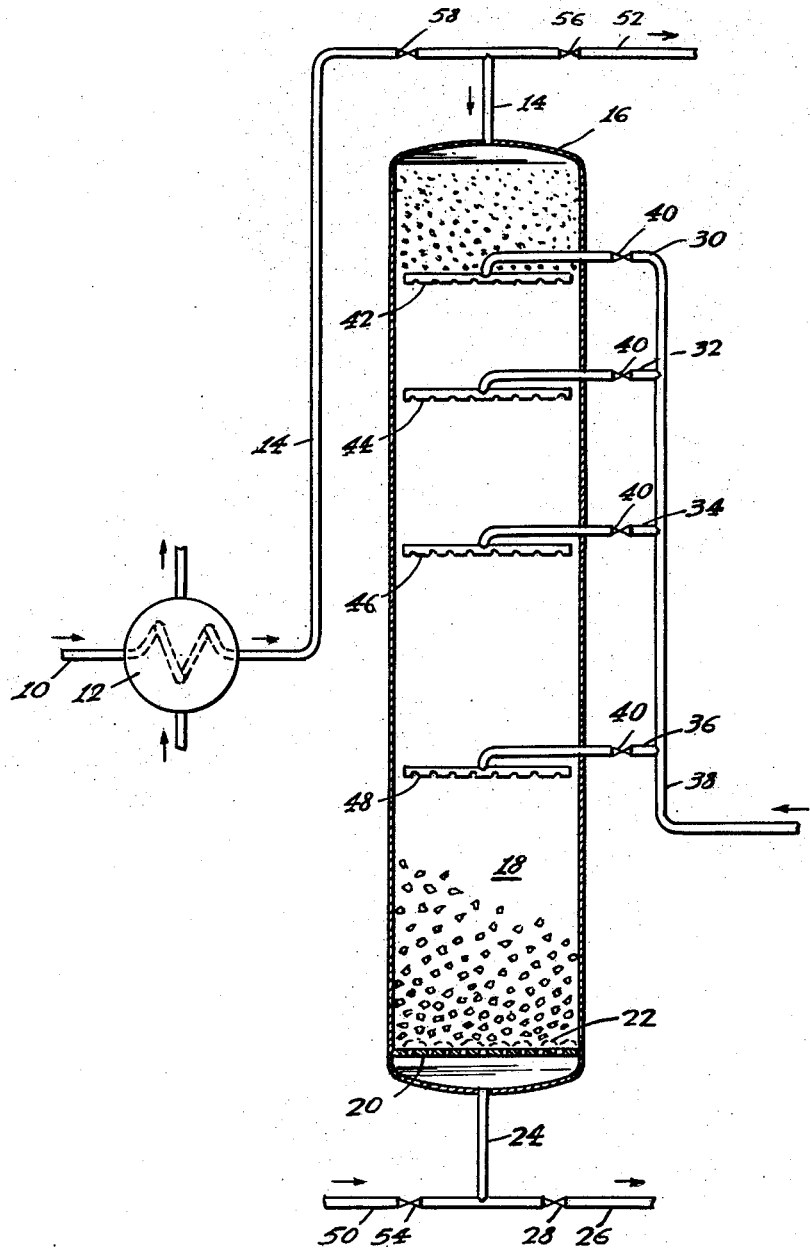
INVENTOR.
Claude R. Summers Jr.
BY
ATTORNEY

2,892,002

POLYMERIZATION OF OLEFINS AND REACTOR THEREFOR

Claude R. Summers, Jr., Havertown, Pa., assignor to Gulf Oil Corporation, Pittsburgh, Pa., a corporation of Pennsylvania Application February 28, 1955, Serial No. 490,749

8 Claims. (Cl. 260—683.15)

This invention relates to the catalytic polymerization of gaseous olefins and more particularly to a process for the polymerization of olefins in a polymerization reactor of increased capacity and a process for its construction.

One process used for up-grading gaseous olefins produced in oil refineries is the catalytic polymerization of the gaseous olefins to produce polymerized liquid hydrocarbon products boiling in the gasoline boiling range. The polymerized liquid products are valuable for blending in gasoline because of their high anti-knock qualities. The polymerization of the olefins is ordinarily accomplished by passing gaseous olefins, predominantly propylene and butylene, which ordinarily are in a mixture with saturated hydrocarbons of substantially the same boiling point, through a bed of a polymerization catalyst at polymerization temperatures in the range of approximately 300° to 400° F. One type of catalyst used for the polymerization of olefins is prepared by the impregnation of porous supports or carriers with phosphoric acid. Kieselguhr is a carrier for the phosphoric acid commonly used in impregnated catalyst. The resultant impregnated catalyst is ordinarily used in the form of pellets or granules of about one-quarter inch in diameter.

The impregnated phosphoric acid catalysts have a tendency to powder during use, which tendency is especially serious if the charge stock is contaminated with moisture. The impregnated catalysts lose activity during use and must be regenerated at frequent intervals by burning gums and resins from the pores of the catalyst. Another disadvantage of the impregnated catalysts is a tendency to over-polymerize substantial quantities of the charge stock, probably as a result of portions of the charge stock residing for extended periods in the pores of the catalyst and forming a base for further over-polymerization.

Many of the difficulties encountered with impregnated catalysts have been overcome by the use of phosphoric acid polymerization catalysts known as acid-film catalysts. In the acid-film catalysts, a non-porous, non-absorptive catalyst support in place in the reactor is covered with phosphoric acid, after which phosphoric acid is allowed to drain from the catalyst to leave a film of phosphoric acid on the support. The phosphoric acid constituting the film on the catalyst support is concentrated in place by passing a gas of controlled humidity through the catalyst bed until the acid is of the desired concentration. Among the suitable supports for the acid-film catalysts are crushed quartz, silica sand, and glass particles. The preparation of acid-film catalysts is described in U.S. Patent No. 2,186,021.

The acid-film catalysts do not powder during use nor are they seriously deteriorated by the presence of small amounts of moisture in the charge stock. Another advantage of the acid-film catalysts is that they can be easily regenerated by washing the catalyst with water after which the washed catalyst is again covered with phosphoric acid. Although many of the difficulties experienced with impregnated catalyst can be avoided by the use of acid-film catalyst, the conversions obtained with the acid-film catalysts have, in many instances, been disappointingly low. In addition, massive coke deposits have been formed in beds of acid-film catalyst because of non-uniform conditions in the catalyst bed. The coke deposits cannot be washed from the catalyst, but require burning for their removal. The non-uniform conditions in the reactor are caused principally by channeling of the reactant materials through the catalyst bed.

This invention resides in a process for increasing the capacity of acid-film catalyst olefin polymerization reactors in which the catalyst particles in the reactor are reoriented and gradated from fine to coarse from the inlet of the reactor towards the outlet. The gradation of the catalyst is accomplished by a vigorous backwashing of the catalyst bed after it has been packed in the reactor.

The drawing illustrates a reactor for the polymerization of gaseous olefins according to this invention.

The polymerization of olefins is a strongly exothermic reaction, the rate of which increases with an increase in the temperature of the olefins. A close control of the temperature of the reaction is necessary to prevent over-polymerization of the olefins which if not controlled will continue with the eventual formation of coke on the catalyst particles. In the usual commercial process, an attempt is made to control the temperature of the catalytic polymerization process between approximately 300° F. and 400° F. by the introduction of a quenching medium at intervals in the reactor. The usual quenching medium is a mixture of hydrocarbons boiling in substantially the same range as the charge stock to the reactor which is introduced as a liquid and absorbs heat from the reactant stream to vaporize substantially immediately upon discharge into the reactor.

In olefin polymerization reactors packed with acid-film catalyst on a non-porous support, the catalyst particles are small in order to obtain sufficient surface area in a reactor of reasonable size. The size of the catalyst support may range from about 4 to 50 mesh but generally is in a very narrow range of particle sizes, for example, 20 to 35 mesh, and preferably 28 to 35 mesh is employed. The small particle size of the catalyst support seriously increases the difficulty with channeling of the reactant fluids passing through the catalyst bed. A substantial portion of the liquids and gases passes rapidly through channels formed in the catalyst bed. The resulting small surface area of the catalyst contacted by the large stream of reactant materials and the short time of contact cause poor conversion of substantial quantities of the charge stock. Other portions of the charge stock enter stagnant zones in the catalyst bed and because of the long time of contact and the large surface area of the catalyst available per unit of charge stock passing through the stagnant zones, the charge stock in the stagnant zones is often over-polymerized. The stagnant zones of the catalyst bed become hot spots which may reach temperatures as high as 450° F. thereby further aggravating the over-polymerization. The addition of a quenching medium at intervals throughout the catalyst bed reduces the average temperature; however, it is difficult to distribute the quenching medium evenly in a catalyst bed packed with very fine particles.

In the apparatus illustrated in the drawings, a charge stock is delivered through a line 10 to a preheater 12 in which the charge stock is preheated to the desired temperature and delivered through a line 14 to a reactor 16 having an inlet at its upper end and an outlet at its lower end. The reactor 16 is packed with a single continuous bed 18 of an acid-film catalyst. The bed of catalyst is supported by a grid 20 at the lower end of the reactor on which a suitable wire screen 20 rests to prevent passage of catalyst particles downward through the grid. The acid-film catalyst in the bed 18 is a widely used and well known polymerization catalyst of the type prepared according to the process described in U.S. Letters Patent No. 2,186,021. More recently it has been the practice to use even finer catalyst particles than the catalyst described in that patent and bed 18 consists of crushed quartz particles of a narrow range of particle sizes, for example, 28 to 35 mesh, having a film of phosphoric acid on its surface.

Extending from the lower end of reactor 16 is an outlet line 24 which is connected with a product line 26 for delivery to a stabilizer, not shown, in which the unpolymerized gaseous olefins and saturated gaseous hydrocarbons are stripped from the liquid product. Line 26 is provided with a valve 28 which prevents flow through the line when the catalyst bed is gradated in the manner hereinafter described.

A series of quench lines 30, 32, 34 and 36 extends from a quench supply line 38 into the reactor 16. Each of the quench lines is provided with a valve 40 for control of the distribution of the quenching medium between the several quench lines into the reactor. Spiders 42, 44, 46 and 48 are connected to the ends of the quench lines 30, 32, 34, and 36, respectively, within the reactor 16 to distribute the quenching medium over the entire cross-section of the reactor 16. Suitable quenching mediums are condensed overhead product from the stabilizer or cold, liquid charge stock.

The charge stock supplied through line 10 is generally a mixture of hydrocarbons boiling primarily in the C–3 to C–4 range. The charge stocks ordinarily are between about 30 and about 70 percent olefins, the remainder being saturated hydrocarbons boiling in the same range which serve as a diluent facilitating the control of the temperature in the reactor. Approximately 20 to 40 percent of the usual charge stock boils in the C–3 range and 60 to 80 percent in the C–4 range; however, the charge stock can be either C–3 or C–4 fractions or any mixture of the two. A typical charge stock is one containing approximately 65 percent olefins with 20 to 25 percent of the olefins boiling in the C–3 range and 75 to 80 percent boiling in the C–4 range.

The charge stock is heated in preheater 12 to a temperature in the range of about 200° to 350° F., preferably from 320° to 350° F., for induction into the reactor 16 which is maintained at a temperature of 300° to 400° F. The pressure of the reactor is maintained between about 125 p.s.i.g. and 400 p.s.i.g.

The products discharge from the lower end of the reactor through line 24 are ordinarily delivered through product line 26 to a stabilizer, not shown, in which the polymerized liquid product is stripped of the unpolymerized gaseous olefins and saturated gaseous hydrocarbons. A typical analysis of the gases stripped from the liquid product in the stabilizer is:

| | Percent by volume |
|---|---|
| Propene | 7.7 |
| Propane | 11.8 |
| Butene | 29.5 |
| Butane | 51.0 |

The gases are condensed and a portion returned to the reactor either as recycle added to the fresh feed or as quenching medium.

In this invention, the catalyst support particles in the catalyst bed are gradated with the particle sizes increasing towards the lower end or outlet of the catalyst bed 18. The gradation of the catalyst support particles is accomplished after the catalyst support particles have been random packed in the bed, but prior to the introduction of the phosphoric acid onto the support, by vigorously backwashing the bed of catalyst support with water or other liquid. The term "backwashing" denotes an upward flow of liquid through the catalyst bed. For this purpose, a backwash line 50 is connected to product line 24 and a backwash outlet line 52 is connected to line 14. A valve 54 in backwash line 50 and a valve 56 in backwash outlet line 52 allow those lines to be shut off from the reactor during the normal operation of the polymerization process. A valve 58 in line 14 and valve 28 in product line 26 allow those lines to be shut off during the backwashing of the catalyst bed. The backwashing is accomplished by introducing water or other liquid through line 50 into the reactor and discharging the liquid from the reactor through line 52 while valves 58 and 28 are closed.

The backwashing of the catalyst bed causes a "lifting" and opening up of the catalyst bed which allows the movement of the catalyst particles in the bed required for gradation to occur. The minimum rate of flow is determined by the minimum rate required for the "lifting" and will depend upon the sizes of the particles making up the bed. For the reorientation of the catalyst particles in the catalyst bed described having particle sizes in the 28 to 35 mesh range, backwash rates in excess of about 8.5 gallons per square foot per minute are required. Higher backwashing rates are required if the catalyst bed is made up of larger particles.

The "lifting" of the bed during the backwashing causes an expansion of the bed. The maximum rate of backwashing will be determined by the maximum allowable bed expansion which is determined by the head space above the upper surface of the bed. Backwashing rates as high as about 45 gallons per square foot of catalyst bed per minute have been employed satisfactorily to reorient catalyst support particles ranging from 4 to 35 mesh.

The backwashing of the catalyst bed results in a gradation of the catalyst support particles in the bed with the finer particles at the upper end of the bed and the larger particles at the lower end. The gradation is sufficiently extensive that the difference in the size of particles at the top of the bed and at the lower end of the bed can readily be observed even when the bed is initially packed with catalyst support particles in the narrow range of 20 to 35 mesh.

In addition to the gradation of the catalyst bed, the backwashing reorients the catalyst particles to produce a more open catalyst bed which allows flow of the reactant materials more uniformly over the entire cross section of the bed. The more open structure of the bed after backwashing is indicated by a permanent expansion of the catalyst bed ranging from 4 to as high as 25 percent as well as an increase in the void space in the catalyst bed which ranges from about 20 to about 100 percent.

The backwashing of the catalyst bed reduces channeling through the catalyst bed by providing a more open bed and reduces resistance to flow through the bed as shown by the increase in flow rates of fluids through the bed. An additional effect of backwashing is to remove extremely fine catalyst support particles in the nature of dust from the catalyst bed. The following examples indicate the increased capacity of a packed bed of catalyst as a result of backwashing the catalyst bed according to this invention.

EXAMPLE I

A catalyst support for an acid-film polymerization catalyst was random packed in a tower. The catalyst support had the following particle size analysis.

| | Percent by weight |
|---|---|
| 4–9 mesh | 28.8 |
| 9–20 mesh | 23.2 |
| 20–28 mesh | 24.7 |
| 28–35 mesh | 23.3 |

The tower was filled with a liquid to a height of approximately 20 inches above the level of the catalyst.

The liquid was then withdrawn from the bottom of the tower and added to the top of the tower at the rate required to maintain a constant liquid level above the upper surface of the catalyst bed. The rate at which the liquid passed through the catalyst bed is designated as the permeability of the bed and was 3.9 gallons per square foot per minute. The void space in the catalyst bed was determined by filling the catalyst bed exactly to its upper level with a liquid, draining the liquid to the level of the catalyst support, and measuring the volume of liquid drained.

The catalyst bed of Example I was backwashed with water at a rate of 30.95 gallons per square foot per minute. After backwashing, the permeability was determined in the manner described above for the random packed catalyst, at the same head of liquid pressure, and was found to be 8.4 gallons per square foot per minute. The permanent expansion of the bed was 23 percent. The catalyst bed expands during backwashing and is slightly compressed on re-use after backwashing but reaches a permanent volume larger than the volume of the random packed catalyst bed. The void space after backwashing was measured in the manner described for the random packed catalyst and found to have increased by 97.3 percent.

EXAMPLE II

The procedure described in Example I was repeated with a catalyst support having the following particle size analysis.

| | Percent |
|---|---|
| 4–9 mesh | 18.0 |
| 9–20 mesh | 50.5 |
| 20–28 mesh | 11.1 |
| 28–30 mesh | 20.4 |

The backwashing was performed at a flow rate of 44.7 gallons per square foot per minute. The results of the backwashing are presented in Table I.

EXAMPLE III

The procedure described in Example I was repeated with a catalyst support having the following particle size analysis.

| | Percent |
|---|---|
| 4–9 mesh | 16.3 |
| 9–20 mesh | 19.9 |
| 20–28 mesh | 46.8 |
| 28–35 mesh | 17.0 |

The backwashing of the catalyst bed was performed at a liquid flow rate of 44.7 gallons per square foot per minute. The results are presented in Table I.

EXAMPLE IV

The procedure described in Example I was repeated with a catalyst support having the following particle size analysis.

| | Percent |
|---|---|
| 9–20 mesh | 33.7 |
| 20–28 mesh | 33.3 |
| 28–35 mesh | 33.0 |

The rate of liquid flow during backwashing was 18.71 gallons per square foot per minute. The results of the backwashing are presented in Table I.

EXAMPLE V

A catalyst support having the following particles size analysis was treated in the manner described in Example I.

| | Percent |
|---|---|
| 20–28 mesh | 47.8 |
| 28–35 mesh | 52.2 |

The catalyst bed was backwashed with water at the rate of 11.5 gallons per square foot per minute. The results of the backwashing are presented in Table I.

EXAMPLE VI

A catalyst support of crushed quartz particles entirely in the range of 28 to 35 mesh was backwashed with water at the rate of 8.79 gallons per square foot per minute. The results of the backwashing are presented in Table I.

*Table I.—Reorientation of a packed bed of quartz carrier using a water backwash*

| Example No | I | II | III | IV | V | VI |
|---|---|---|---|---|---|---|
| Fresh Carrier Distribution, Percent by Wt.: | | | | | | |
| +4–9 meshes/inch | 28.8 | 18.0 | 16.3 | | | |
| +9–20 meshes/inch | 23.2 | 50.5 | 19.9 | 33.7 | | |
| +20–28 meshes/inch | 24.7 | 11.1 | 46.8 | 33.3 | 47.8 | |
| +28–35 meshes/inch | 23.3 | 20.4 | 17.0 | 33.0 | 52.2 | 100.00 |
| Before Backwashing: | | | | | | |
| Permeability of Bed, gal./ft.²/min | 3.9 | 6.3 | 5.9 | 37.4 | 6.9 | 6.8 |
| Void Space, Percent of Bed | 31.0 | 28.5 | 25.6 | 35.7 | 33.5 | 30.6 |
| Backwash Rate, gal./ft.²/min | 30.95 | 44.70 | 44.70 | 18.71 | 11.50 | 8.79 |
| After Backwashing: | | | | | | |
| Permeability of Bed, gal./ft.²/min | 8.4 | 8.9 | 8.7 | 8.1 | 7.5 | 7.2 |
| Increase in Permeability, Percent [a] | 115.4 | 41.3 | 47.5 | 9.5 | 8.7 | 5.9 |
| Final Settled Bed Expansion, Percent [a] | 23.0 | 22.8 | 21.2 | 11.0 | 7.4 | 8.4 |
| Void Space, Percent of Orig. Bed [a] | 61.1 | 53.1 | 46.3 | 47.5 | 39.7 | 7.4 |
| Increase in Void Space, Percent [a] | 97.1 | 86.3 | 80.9 | 33.1 | 18.5 | 22.2 |

[a] Based on measurements taken before backwashing.

The data set forth in Table I show that the void space and the permeability of the catalyst bed are markedly increased by backwashing. Even in the case of the catalyst bed consisting of the very narrow range of 28 to 35 mesh catalyst support particles in which the possible gradation is limited, an increase in the permeability of the catalyst bed of 5.9 percent was obtained. The increase in the void space in the catalyst bed by 22.2 percent greatly diminishes the channeling that occurs in the bed. The resultant more uniform flow, with the avoidance of stagnant zones and accompanying hot spots allows a higher average temperature to be maintained in the reactor, without danger of excessive coking. The more open bed resulting from the backwashing allows increased rates of flow of both gases and liquids downwardly through the catalyst. When the catalyst bed is made up of a wider range of particle sizes, an even greater improvement in the properties of the catalyst bed can be obtained by backwashing, as shown in Table I.

Backwashing the catalyst bed according to this invention produces a marked gradation of the catalyst particles at various levels in the bed. In the narrow range of 28 to 35 mesh particles of Example I, the difference in the particle size at the top of the catalyst bed and at the bottom of the catalyst bed could easily be seen. In the catalyst beds made up of a wider range of particle sizes as in Examples 1 through 5, the difference in the particle sizes at different elevations in the tower was readily noted.

As an illustration of the polymerization of olefins in a reactor having a gradated catalyst bed, a charge stock is passed downwardly through a reactor 9 feet in diameter and 44 feet high at a rate of 170 barrels per hour liquid volume. The charge stock has the following analysis.

| | Percent by volume |
|---|---|
| Propene | 13.7 |
| Propane | 6.3 |
| Butanes | 27.3 |
| Total butenes | 52.7 |

The charge stock is introduced into the reactor at a temperature of 320° F. and the reactor is maintained at an average temperature of 375° F. The improvement made possible by this invention is principally in the increase in the conversion of unpolymerized gaseous olefins to polymerized liquid product without excessive coke formation. The analysis of the stabilized liquid product is not appreciably different than that obtained in operation with the conventional reactors giving a product having the following analysis.

| | Percent |
|---|---|
| Hexanes | 13.4 |
| Heptanes | 16.4 |
| Octanes | 29.7 |
| Nonenes | 9.3 |
| 334° F. midpoint material | 22.6 |
| 419° F. midpoint material | 7.8 |

I claim:

1. A process for the construction and arrangement of catalyst particles of a catalyst bed in a reactor for the polymerization of gaseous olefins, said bed having small cross section dimensions relative to its height, comprising random packing a reaction vessel having an inlet at its upper end and an outlet at its lower end with a nonporous siliceous acid-film catalyst support having particles ranging in size from 4 to 50 mesh, backwashing the random packed catalyst support with water introduced into the reactor at its outlet and discharged from the reactor at its inlet at a rate of at least 8.5 gallons per square foot per minute, to gradate the catalyst support according to particle size with the finer particles near the inlet of the reactor and the coarser particles near the outlet, draining the water from the catalyst support, covering the catalyst support with phosphoric acid and draining phosphoric acid from the catalyst support to leave a film of phosphoric acid upon the surface of the support.

2. A process for the polymerization of gaseous olefins to form a polymerized product comprising passing the gaseous olefins downwardly through an acid-film catalyst bed which has been oriented by backwashing with a liquid at a rate of flow of at least 8.5 gallons per square foot per minute to produce a bed gradated according to particle size with the smaller particles at the upper end of the bed, the catalyst particle sizes being within the range of 4 to 50 mesh.

3. In a process for construction and arrangement of catalyst particles of a catalyst bed in an acid-film catalytic polymerization reactor in which the bed of acid-film catalyst consisting of particles having sizes in the approximate range of 4 to 50 mesh is supported in the reactor between the inlet and outlet thereof and the catalyst support is covered with phosphoric acid while in place in the reactor, and phosphoric acid is allowed to drain from the reactor to leave a film of acid on the catalyst support, the improvement comprising backwashing the bed of catalyst support in place in the reactor prior to covering with acid with water flowing upwardly through the catalyst bed at a rate of at least about 8.5 gallons per square foot per minute to the particles according to size with the smaller particles at the upper end of the bed and orient the catalyst particles in the catalyst bed.

4. In a process for construction and arrangement of catalyst particles of a catalyst bed in an acid-film catalytic polymerization reactor in which the bed of acid-film catalyst consisting of particles having sizes in the approximate range of 28 to 35 mesh is supported in the reactor between the inlet and outlet thereof and the catalyst support is covered with phosphoric acid while in place in the reactor, and phosphoric acid is allowed to drain from the reactor to leave a film of acid on the catalyst support, the improvement comprising backwashing the bed of catalyst support in place in the reactor prior to covering with acid with water flowing upwardly at a rate of at least about 8.5 gallons per square foot per minute to gradate the particles according to size with the smaller particles at the upper end of the bed and orient the catalyst particles in the catalyst bed.

5. A process for the polymerization of gaseous olefins to form a polymerized liquid product comprising passing the gaseous olefins downwardly through a bed of phosphoric acid-film polymerization catalyst in which the catalyst particle sizes range from 4 to 50 mesh, and are gradated according to size with particles of any specific size within the range at substantially the same elevation and the smaller particles at the upper end of the bed by backwashing the catalyst bed with water flowing upwardly through the bed.

6. A process as set forth in claim 5 in which the catalyst particles have sizes in the range of 28 to 35 mesh.

7. Apparatus for the polymerization of gaseous olefins comprising an elongated vertical cylindrical reactor having an inlet at its upper end and an outlet at its lower end, a catalyst bed of an acid-film polymerization catalyst supported in the reactor between the inlet and outlet thereof, said catalyst bed having small horizontal dimensions relative to its height, the catalyst bed having an increased percentage of voids relative to random packed catalyst, the size of the catalyst particles making up the bed being within the range of 4 to 50 mesh, and the particles in the bed being gradated to position particles of the same size at substantially the same elevation in the bed with the smaller particles at the upper end of the bed, said particles in the catalyst bed having been gradated and the voids in the bed increased by passing a liquid upwardly through the bed at a rate of at least 8.5 gallons per square foot per minute.

8. Apparatus as set forth in claim 7 in which the size of the particles of catalyst are in the range of 28 to 35 mesh.

References Cited in the file of this patent

UNITED STATES PATENTS

| 1,291,137 | Reed | Jan. 14, 1919 |
|---|---|---|
| 1,366,439 | Weber | Jan. 25, 1921 |
| 1,367,993 | Stahl | Feb. 8, 1921 |
| 1,518,043 | Andianne et al. | Dec. 2, 1924 |
| 2,199,891 | Martin | May 7, 1940 |
| 2,579,433 | Holm et al. | Dec. 18, 1951 |
| 2,708,682 | Dauber et al. | May 17, 1955 |

UNITED STATES PATENT OFFICE
CERTIFICATE OF CORRECTION

Patent No. 2,892,002                                                      June 23, 1959

Claude R. Summers, Jr.

It is hereby certified that error appears in the printed specification of the above numbered patent requiring correction and that the said Letters Patent should read as corrected below.

Column 1, line 36, for "catalyst" read -- catalysts --; column 3, line 52, for "discharge" read -- discharged --; columns 5 and 6, Example VI, Table I, under the heading IV, fifth item thereof, for "37.4" read -- 7.4 --; same table, under the heading VI, second item from bottom, for "7.4" read -- 37.4 --; column 8, line 5, after "minute to" insert -- gradate --.

Signed and sealed this 3rd day of November 1959.

(SEAL)
Attest:

KARL H. AXLINE                                              ROBERT C. WATSON
Attesting Officer                                         Commissioner of Patents